Patented June 22, 1943

2,322,507

UNITED STATES PATENT OFFICE 2,322,507

METHOD OF BONDING

Norman W. Cole, Detroit, Mich.

Application May 15, 1940, Serial No. 335,351

1 Claim. (Cl. 29—188)

My invention pertains to an improved method of bonding castings of hard alloy metal containing chromium boride to a base or frame member of metal or any other metallic member.

Practical examples from the prior art will serve to illustrate the utility of my improved process. It has been the practise for some time in the arts to braze or solder alloy castings of various compositions to base metal parts for the purpose of providing increased life and strength to such part. In many cases it is not practicable to use such solders on account of their low melting point and/or decreased strength at elevated temperatures, for instance, when the part, such as a high pressure valve, must operate at elevated temperatures. Under such conditions it has been the practise to weld the facing alloy to the part in question so that there would be no danger of the alloy becoming loosened at high temperatures.

But the welding of such parts involves considerable expense and trouble, due to the cost of welding rods, gases and labor. It is seldom ever possible to apply a thin uniform layer of facing metal to a heavy part without having defects, such as blow holes and cracks appear after machining. Also when such defects appear they must be removed by pre-heating the entire part and smoothing out defects with the welding torch, after which the heavy part must be slowly cooled to avoid cracks in the alloy metal.

It is accordingly an object of my invention to provide an improved process for bonding castings of a hard alloy metal containing chromium boride to metallic base members which will be more satisfactory and economical, which will be useful under higher temperature conditions, and which will be especially useful for bonding machined or unmachined alloy castings to base metal members for the purpose of providing increased durability of the completed structure to resist abrasion, corrosion, oxidization, galling and impact.

It is also an object of my invention to provide an improved process for bonding alloy castings to a base member which consists in selecting or making the castings of an alloy having one component with a melting point sufficiently below the melting point of any other component of the alloy, and suitably below the melting point of the base member, placing the alloy casting upon the base member, heating the casting and base member in a non-oxidizing atmosphere to a temperature above the melting point of said one alloy component to form a superficial alloy between said one alloy component and the metal of the base member, and cooling the alloy casting and the base member to freeze the bonded joint thus established.

The invention itself, however, both as to its organization and its method of operation, together with additional objects and advantages thereof, will best be understood from the following description, taken in conjunction with the drawing wherein:

Fig. 1 is a cross sectional view through a valve 11 showing a valve ring insert 13 placed thereon for bonding; and Fig. 2 is a view showing the valve seat insert seated therein after bonding in accordance with my invention.

In accordance with my invention the casting to be attached, is made or selected of a suitable alloy having one component with a sufficiently lower melting point than any other component to act as an alloying bonding agent on the base member when heat is applied in a non-oxidizing atmosphere or condition.

The casting of the alloy metal is placed in position on the base metal part and the whole is heated to a temperature above the melting point of the lowest melting component of the alloy metal employed. The heating is done in a hydrogen furnace, in a vacuum, in an atmosphere-controlled furnace, or in any medium which will prevent oxidation of the metals during the heating operation.

The temperature necessary to obtain a good bond depends upon the alloy metal used. If the lowest melting component of the alloy employed has a melting point of 1850° F., a furnace temperature of 1900° has been found to give good results. At this temperature of the alloy metal casting is sufficiently plastic to conform to the surface of the base member without losing its original shape to any appreciable extent. When contact is obtained a superficial alloying takes place between the component of lowest melting point and the base metal which, after freezing, acts as a cement to hold the two dissimilar metals together. The fabricated structure is then cooled to freeze the bond. When the two metals have approximately the same coefficient of expansion, there is no danger of checking or cracking upon cooling, nor are there any internal stresses set up which might cause rupture after the part is in service.

This process makes many here-to-fore difficult and costly operations extremely simple and economical.

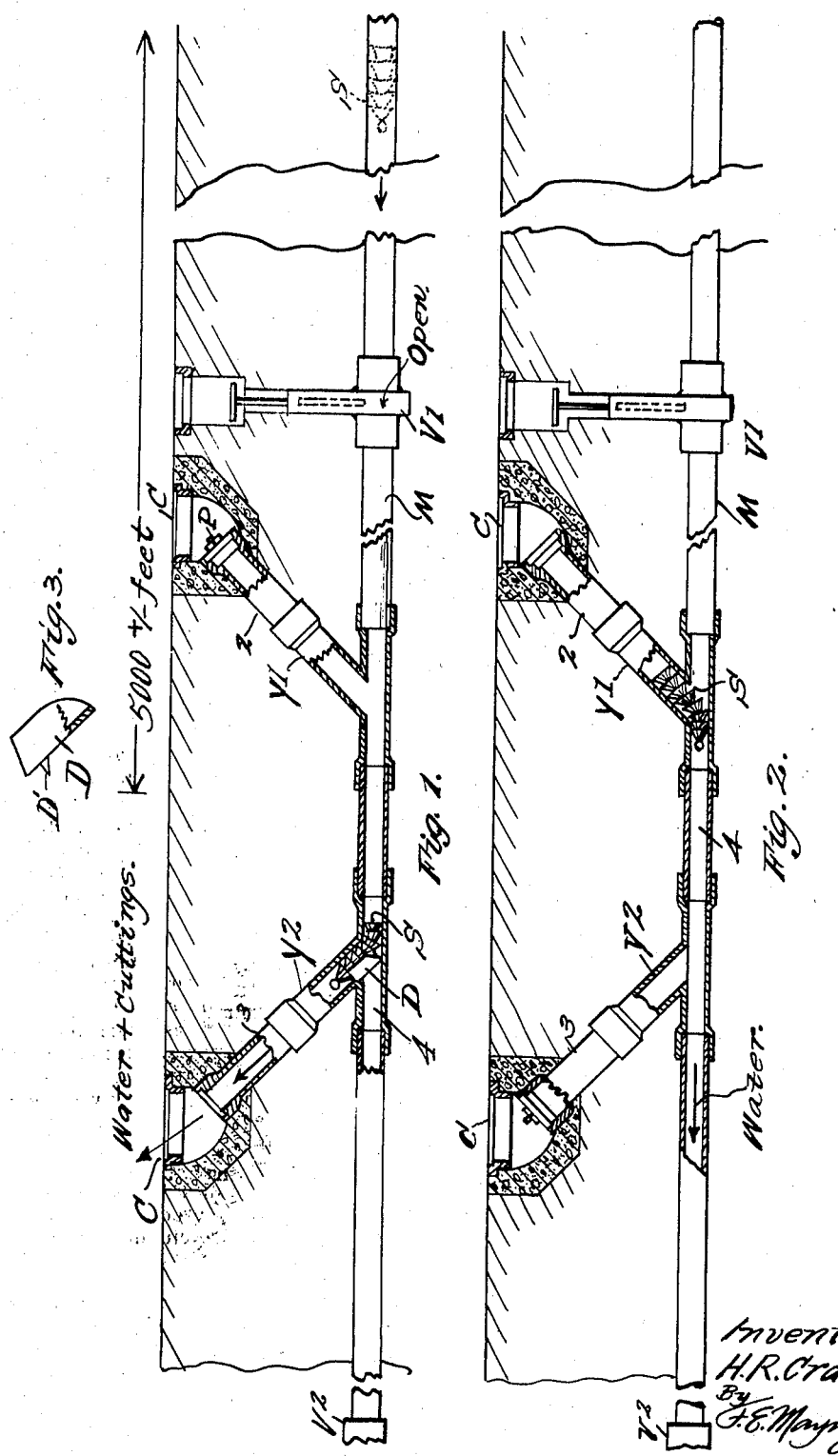

As shown in Figs. 1 and 2, practical example